US012656255B2

(12) United States Patent
Adams

(10) Patent No.: US 12,656,255 B2
(45) Date of Patent: Jun. 16, 2026

(54) PRECISION OPTICAL SPECTROSCOPY IN A MASS SPECTROMETER

(71) Applicant: Bernhard W. Adams, Naperville, IL (US)

(72) Inventor: Bernhard W. Adams, Naperville, IL (US)

( * ) Notice: Subject to any disclaimer, the term of this patent is extended or adjusted under 35 U.S.C. 154(b) by 321 days.

(21) Appl. No.: 18/250,109

(22) PCT Filed: Oct. 22, 2021

(86) PCT No.: PCT/US2021/056203
§ 371 (c)(1),
(2) Date: Apr. 21, 2023

(87) PCT Pub. No.: WO2022/087376
PCT Pub. Date: Apr. 28, 2022

(65) Prior Publication Data
US 2023/0393065 A1      Dec. 7, 2023

Related U.S. Application Data

(60) Provisional application No. 63/104,972, filed on Oct. 23, 2020.

(51) Int. Cl.
*G01N 21/64*              (2006.01)
(52) U.S. Cl.
CPC .............................. *G01N 21/6402* (2013.01)
(58) Field of Classification Search
USPC ...................................................... 250/282
See application file for complete search history.

(56) References Cited

U.S. PATENT DOCUMENTS

| | | | |
|---|---|---|---|
| 6,879,394 B2 | 4/2005 | Amblard et al. | |
| 9,835,741 B1 | 12/2017 | Brubaker et al. | |
| 2004/0031906 A1 | 2/2004 | Glecker | |
| 2005/0214167 A1* | 9/2005 | Archibald .......... | G01N 21/3577 422/68.1 |
| 2005/0244863 A1* | 11/2005 | Mir .......................... | B82Y 5/00 435/7.1 |
| 2006/0007439 A1 | 1/2006 | Corcoran | |
| 2006/0187448 A1 | 8/2006 | Ye et al. | |
| 2008/0035834 A1 | 2/2008 | Gleckler | |
| 2008/0103373 A1 | 5/2008 | Matter et al. | |
| 2011/0320174 A1 | 12/2011 | Ragan et al. | |
| 2015/0080712 A1 | 3/2015 | Van Keersop et al. | |
| 2017/0176338 A1 | 6/2017 | Wu et al. | |

(Continued)

FOREIGN PATENT DOCUMENTS

| | | |
|---|---|---|
| CN | 108387560 A | 8/2018 |
| CN | 110320193 A | 10/2019 |

OTHER PUBLICATIONS

"Extended European Search Report Received for European Patent Application No. 20174983.5, mailed on Oct. 16, 2020", 10 pages.

(Continued)

*Primary Examiner* — Kiet T Nguyen
(74) *Attorney, Agent, or Firm* — Adler Pollock & Sheehan P.C.

(57) ABSTRACT

A method includes performing Fluorescence-Lifetime-Spectroscopy (FLS) measurements with a time-resolving imaging sensor continuously without time-gating or modulating a light sensitivity of the imaging sensor.

4 Claims, 4 Drawing Sheets

(56)                    References Cited

U.S. PATENT DOCUMENTS

2017/0343477 A1 *  11/2017  Santori ..................... G01J 3/18
2019/0195688 A1     6/2019  Atabaki et al.
2021/0191095 A1     6/2021  Howard et al.

OTHER PUBLICATIONS

"International Search Report and Written Opinion received for PCT Patent Application No. PCT/US2021/027883, mailed on Sep. 17, 2021", 11 pages.
"International Search Report and Written Opinion received for PCT Patent Application No. PCT/US2021/056203, mailed on Feb. 17, 2022", 10 pages.
Hamamatsu Photonics, "Guide to Streak Cameras", Guidebook, Retrieved from the Internet on Aug. 11, 2021: <URL: https://www.hamamatsu.com/resources/pdf/sys/SHSS0006E_STREAK.pdf>, 2008, 12 pages.
"Partial Supplementary European Search Report received for EP Patent Application No. 21793655.8, mailed on Apr. 29, 2024", 14 pages.
"Extended European Search Report received for EP Patent Application No. 21793655.8, mailed on Jul. 24, 2024", 12 pages.
Minot, et al., "Large Area Picosecond Photodetector (LAPPD) Performance Test Results", IEEE, 2018, 4 pages.
Minot, et al., "Pilot Production and Advanced Development of Large-Area Picosecond Photodetectors", Proceedings of SPIE, vol. 9968, 2016, pp. 99680X-1-99680X-14.

* cited by examiner

PRECISION OPTICAL SPECTROSCOPY IN A MASS SPECTROMETER

CROSS REFERENCE TO RELATED APPLICATIONS

This application claims benefit from U.S. Provisional Patent Application Ser. No. 63/104,972, filed Oct. 23, 2020, which is incorporated by reference in its entirety.

BACKGROUND OF THE INVENTION

The present invention relates generally to detection and identification of molecules, and more particularly to precision optical spectroscopy in a mass spectrometer.

In general, mass spectrometers show amounts of matter particles as a function of their masses. They do so by electrically charging the particles, and then manipulating them through electromagnetic—mostly electrostatic—interactions. Thus, the particles, which may be nanoparticles, molecules, or molecular fragments, are discriminated by their mass-to-charge ratio, and a singly charged molecule of a particular mass will appear the same as a doubly charged one of twice that mass, and so on. In their core functionality, mass spectrometers only report the presence and amounts of molecules as a function of the mass/charge ratio, but do not provide further information on them.

Optical spectroscopy can provide rich information on the identity, chemical composition, and chemical activity of molecules. Fluorescence methods are particularly useful for small quantities of sample molecules because they provide a bright signal on a dark background. As the name implies, optical spectroscopy normally is concerned with a measurement of fluorescent light intensity over the wavelength spectrum of the excitation or emitted light or both.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including performing Fluorescence-Lifetime-Spectroscopy (FLS) measurements with a time-resolving imaging sensor continuously without time-gating or modulating a light sensitivity of the imaging sensor.

In another aspect, the invention features a method including performing Time-resolved Hyperspectral Imaging Spectroscopy measurements with a time-resolving imaging sensor continuously without time-gating or modulating a light sensitivity of imaging the sensor.

In still another aspect, the invention features a method including performing Time-resolved Hyperspectral Imaging Spectroscopy (THIS) on a molecular or particulate species captured and present in a trapping-type mass spectrometer.

In another aspect, the invention features a method including performing a Time-resolved Hyperspectral fluorescence Spectroscopy (THS) on a molecular or particulate species mass-selected and deposited onto a substrate by a mass spectrometer.

In another aspect, the invention features a method including performing Time-resolved Hyperspectral fluorescence Spectroscopy (THS) in a form of Time-resolved Hyperspectral Imaging Spectroscopy (THIS) on a molecular or particulate species mass-selected and deposited onto a substrate by a mass spectrometer where one image coordinate corresponds to locations of the mass-selected species on the substrate and the other to a wavelength.

In another aspect, the invention features a method including performing THS on a molecular or particulate species present in a time-of-flight (TOF) or a trapping-type mass spectrometer.

In another aspect, the invention features a method including performing Time-resolved Hyperspectral fluorescence Spectroscopy (THS) in a form of Time-resolved Hyperspectral Imaging Spectroscopy (THIS) on a molecular or particulate species captured and present in a trapping-type mass spectrometer where one image coordinate corresponds to locations of the mass-selected species on their trajectories and the other to a wavelength.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
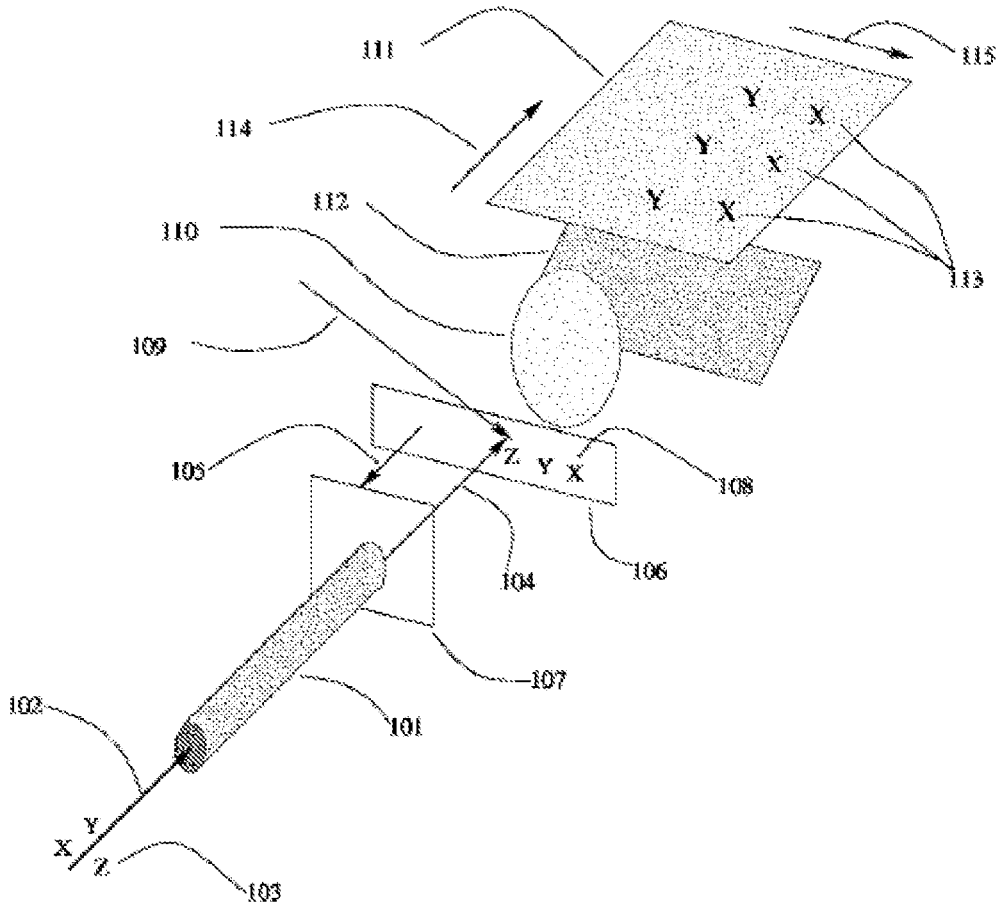
FIG. 1 illustrates an exemplary mass spectrometer.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In one aspect, the present invention relates generally to optical fluorescence spectroscopy, and, in particular, to Fluorescence-Lifetime Spectroscopy (FLS) and Time-resolved Hyperspectral Imaging Spectroscopy (THIS), which adds to FLS a resolution with respect to wavelength. FLS, in particular in it embodiment of FLIM in microscopic imaging, is a widely used and powerful method in the life sciences, and is used mainly to identify proteins and determine their chemical activity. Fluorescence spectroscopy can be sensitive at concentrations down to the level of individual molecules by use of a detector for the fluorescent light that is sensitive to individual photons. If the sample contains a mixture of several molecular species, then the FLS/FLIM/THIS signal is a superposition of those from individual molecules.

A combination of mass spectrometry with fluorescence spectroscopy can yield detailed information on the sample that the two methods cannot provide if used separately from each other. From the point of view of mass spectrometry, FLS/FLIM/THIS adds detailed information on each of the molecular species present in a mass spectrum, and from the point of view of the fluorescence spectroscopy, the mass spectrometer separates molecular species, so their signals are not superimposed on each other.

At a core of the present invention is a combination of mass spectrometry with optical spectroscopy to provide detailed optical-spectroscopic information on the molecular species present in the mass spectrum while obtaining un-mixed optical spectra from molecular species pre-sorted through the mass spectrometer. Several embodiments of this concept are outlined herein.

In the first embodiment, a quadrupole mass spectrometer or a similar device selects molecules of a particular mass/charge ratio at a given time and these molecules then continue their trajectories through an electrical retardation field that slows the molecules to approximately room-temperature thermal velocity, i.e., the average velocity that a molecule of such a mass would have while mixed into an ideal gas at room temperature. The electric field whose strength can be calculated from the known mass/charge ratio of the selected molecules/particles terminates at the surface of a substrate onto which the molecules/particles are depos-ited. The selection properties of the mass-selecting device are tuned as the substrate is moved laterally with respect to the incident molecular beam, so that adjacent spots on the latter receive molecules at various mass tunes of the mass selector. Once the deposition process is completed, the substrate is moved to a spectroscopy site, or spectroscopy is performed in place.

A preferred embodiment is shown in FIG. 1. In it, the optical method of Time-resolved Hyperspectral Imaging Spectroscopy (THIS) is combined with the mass spectrom-eter, using an imaging-capable ultrafast photon detector with a time resolution sufficient for the pertinent time-dependent features in the fluorescence, i.e., a Continuously Ultrafast Time-resolving Imaging Detector (CUTID). In the case of protein fluorescence with decay times of a few nanoseconds, the detector has to resolve a least to one nanosecond, and preferably to about 100 picoseconds or better. The row of adjacent spots on the substrate containing different-mass molecular species is imaged onto the detector via a wave-length-dispersive element, such as a reflection grating. This spreads, dispersed by wavelength, the one-dimensional image of the row of spots on the substrate into an orthogonal dimension. Thus, one image dimension (along the arrow in Fig. FIG. 1 that is labeled mass coordinate 115) of the detector is given to resolving the spots on the substrate where sample molecules were deposited. The other image dimension (along the arrow in Fig. FIG. 1 that is labeled wavelength coordinate 114) is given to the dispersed wave-length spectrum, and photon-occurrence time relative to the excitation-laser pulses is obtained directly from the detector time resolution. The columns of 'X' on the photon detector 111 refer to images at different wavelengths of a particular species X on the substrate.

Figure 2:
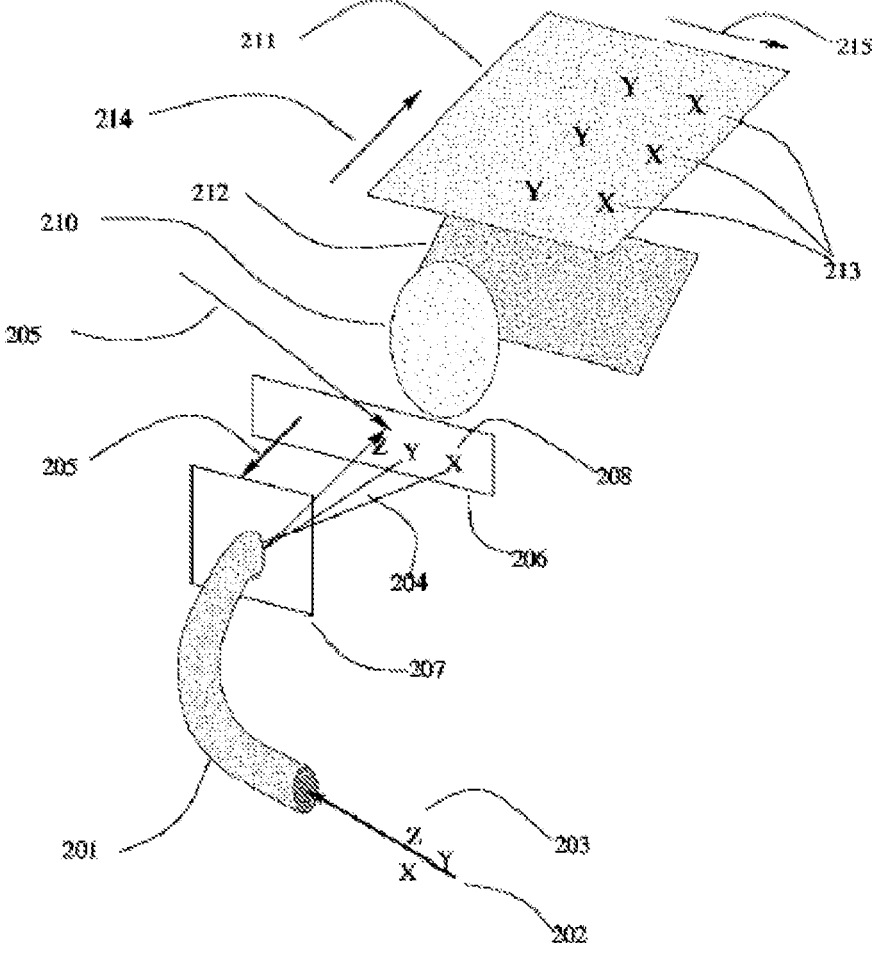
FIG. 2 illustrates an exemplary mass spectrometer that disperses a stream of molecular ions, sending them to different locations on a substrate according to their mass/charge ratios.

Another example is shown in FIG. 2. In this embodiment, the mass spectrometer separates the molecular species over a spatial coordinate by their mass/charge ratio. This can be done, for example, by deflecting a beam of molecular ions in an electrostatic field, so that the molecules fan out with the heaviest ones (highest mass/charge ratio) being deflected the least. After fanning out, the ions are slowed by an electric retardation field as described above, and then deposited onto a substrate. Spectroscopic analysis proceeds as described above.

Figure 3:
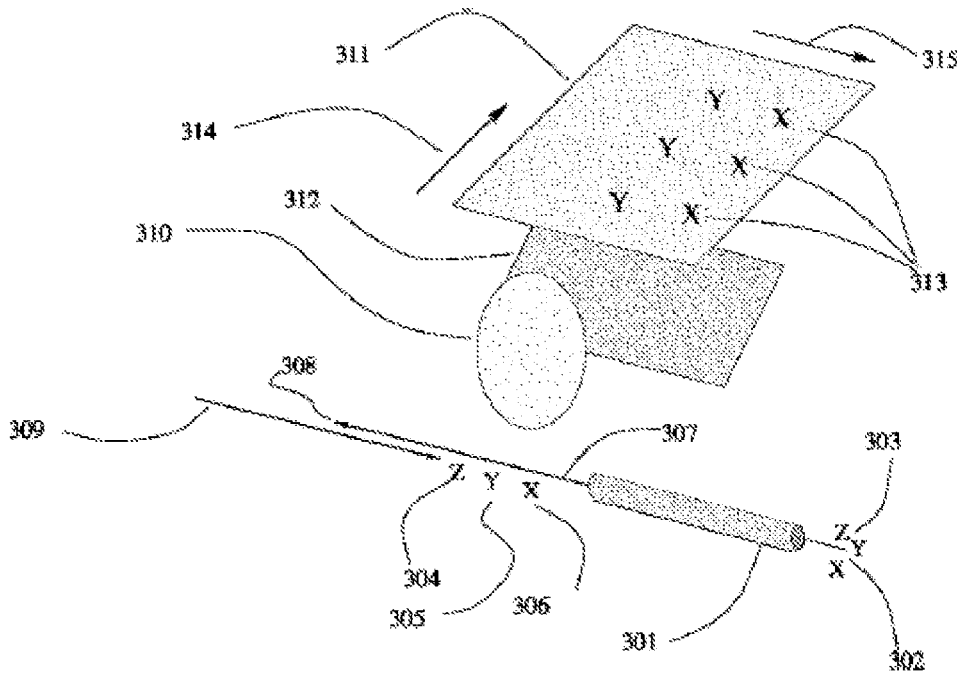
FIG. 3 illustrates an exemplary time-of-flight (TOF) mass spectrometer.

Another example is shown in FIG. 3. In this embodiment, the mass spectrometer separates the molecular species in time, for example by generating a cluster of them within a short time, then accelerating them in an electrostatic field to a particular kinetic energy, and letting them continue their trajectories for some distance. While "drifting", the lighter (lower mass/charge ratio) molecular ions increasingly get ahead of the heavier (higher mass/charge ratio) ones. A pulsed laser that is co- or counterpropagating with the molecular beam excites the molecular ions to fluorescence. The fluorescence is observed in the same way as previously described, except for the fact that the molecules are now not fixed on a substrate, but at deterministically time-dependent positions along the beam. Each mass fraction in the molecu-lar beam, which is characterized, through its velocity, by a particular time-dependent position along the beam axis can be excited multiple times by successive laser pulses. Cor-relating fluorescence signals from successive laser pulses improves the signal statistics. As discussed above, there are two distinctly different timescales: one is the microsecond-millisecond mass-spectroscopic time scale, which is given by the duration of the drift and transit of the molecules through the zone where they interact with the laser. The other is the optical-spectroscopic time scale of fluorescence decay, which is typically much faster, for example a few nanoseconds in the case of proteins. Therefore, samples of the molecular beam at successively higher mass/charge ratios can be sampled with successive excitation pulses, and the full fluorescence process following each will occur within a small fraction of the mass-spectroscopic time scale. At each instant of mass-spectroscopic time, an image of the one-dimensional beam, dispersed by wavelength then forms a two dimensional image, over image coordinates that correspond to mass (coordinate in Fig. FIG. 3 labeled mass coordinate 315), and to wavelength (coordinate in Fig. FIG. 3 labeled wavelength coordinate 314).

Figure 4:
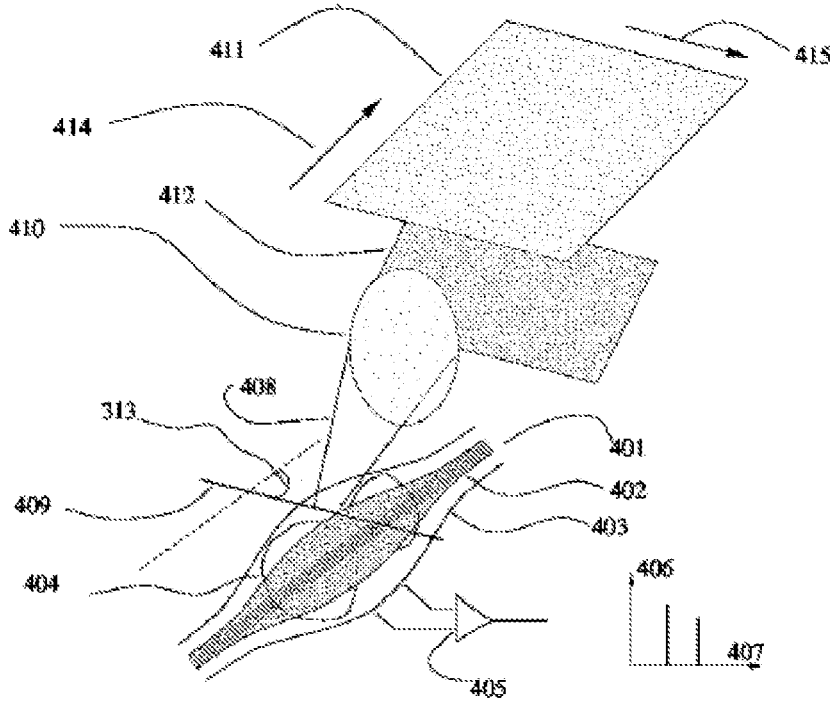
FIG. 4 illustrates an exemplary trapping mass spectrometer.

Another example is shown in FIG. 4. Here, ions caught in a trapping-type mass spectrometer, such as the Orbitrap® or similar device, undergo periodic motions in closed orbits with periods proportional to the square root of their respec-tive mass/charge ratios. Image currents from the ions that are induced in the outer shell of the Orbitrap®, are picked up by a differential amplifier. The total image current is a super-position of the image currents due to the individual orbiting mass fractions. This superposition is resolved into frequency (reciprocal to the orbital periods) components in a Fourier transform, so that, finally, the amounts of orbiting mass fractions appear as peaks over the mass axis. While the ions are orbiting, they can also be excited to fluorescence from a pulsed laser beam passing through the Orbitrap®. The fluorescent light from the linear laser-beam track is imaged onto a CUTID with a dispersive element generating a spectrum. As described above, wavelengths and times after laser excitation are obtained from the detector output. In this embodiment, the spatial coordinate along the laser-beam track does not have a direct meaning referring to masses, as it had in the previously described embodiments. It can, however, be used to identify features in the mass distribution along an orbit tangential to the laser beam by correlating photon occurrences from successive laser pulses at locations along the laser track. Just as the raw signal of the image current is a superposition of components relating to individual mass fractions, so are the fluorescence data. The only difference is that the current is a scalar quantity, i.e., zero-dimensional data over the time axis, and the fluorescence data comprise two-dimensional data (photon-occurrence times after laser excitation and wavelengths) over time. Both can be resolved into components relating to individual molecular mass fractions by the use of the Fourier transformation. As discussed above, there are two time scales: one in the mass-spectroscopic time corresponding to orbital periods measured in microseconds, and the other is the spectroscopic time scale of fluorescent decay measured in nanoseconds. It is therefore possible to perform many optical-spectroscopic measurements within one orbital period and to multiplex the optical-spectroscopic time scale onto the time axis between orbital repetitions.

This method of multiplexing the rapid time scale of optical spectroscopy onto a slower time scale representing another data dimension is a key feature of several variations of Time-resolved Hyperspectral Imaging Spectroscopy (THIS).

As described above, FIG. 1 shows a mass spectrometer that selects from a stream of different-mass molecules those within a particular mass range at a time. These molecules are slowed down and deposited onto a substrate. Optical spectroscopy with time and hyperspectral wavelength resolution is done on multiple samples on the substrate of specific molecular mass each.

More specifically, FIG. 1 shows a mass-selecting mass spectrometer 101 with a molecular-ion beam 102 containing multiple molecular species X, Y, Z 103. Exiting the mass spectrometer is a molecular beam 104 containing only molecules within a narrow range of mass/charge ratios, depending on the tune of the mass spectrometer. The molecules are slowed down by an electric field 105 between a substrate 106 and the exit 107 plane of the mass spectrometer. The electric field 105 is set to a strength that slows the molecular beam to approximately thermal velocity as it hits the substrate 106. The substrate 106 is moved laterally as the setting for transmitted masses in the mass spectrometer 101 is changed in a way to sample all masses of interest. In this way, different mass fractions present in the original molecular-ion beam 102 are deposited in adjacent positions 108 on the substrate 106. A pulsed laser beam 109 excites the sample molecules on the substrate 106 to fluorescence, and the fluorescent light is imaged by a lens 110 or, generally, an imaging optical system onto an imaging-capable ultrafast time-resolving photon detector 111 such as the LAPPD. Part of the imaging system is a wavelength-dispersive element, such as a diffraction grating 112, which sends different wavelengths of fluorescent light to different locations 113, along the wavelength coordinate 114 on the photon detector 111. The other spatial coordinate on the photon detector 111 is called the mass coordinate 115 because it corresponds to the locations on the substrate 106 holding different mass fractions of sample molecules.

As described above, FIG. 2 shows a mass spectrometer that disperses a stream of molecular ions, sending them to different locations on a substrate according to their mass/charge ratios. As the ions are approaching the substrate, they are slowed down and then deposited on it at low velocity. Optical spectroscopy with time and hyperspectral wavelength resolution is done on multiple samples on the substrate of specific molecular mass each.

More specifically, FIG. 2 shows a mass-dispersing mass spectrometer 201 with a molecular-ion beam 202 containing multiple molecular species X, Y, Z 203. Exiting the mass spectrometer are fanned-out molecular beams 204 where each angle in the fan contains a particular mass/charge ratio. The molecules are slowed down by an electric field 205 between a substrate 206 and the exit 207 plane of the mass spectrometer. The electric field 205 is set to a strength that slows the molecular beams in the fan to approximately thermal velocity as they hits the substrate 206. In this way, different mass fractions present in the original molecular-ion beam 202 are deposited in adjacent positions 208 on the substrate 206. A pulsed laser beam 209 excites the sample molecules on the substrate 206 to fluorescence, and the fluorescent light is imaged by a lens 210 or, generally, an imaging optical system onto an imaging-capable ultrafast time-resolving photon detector 211 such as the LAPPD. Part of the imaging system is a wavelength-dispersive element, such as a diffraction grating 212, which sends different wavelengths of fluorescent light to different locations 213, along the wavelength coordinate 214 on the photon detector 211. The other spatial coordinate on the photon detector 211 is called the mass coordinate 215 because it corresponds to the locations on the substrate 206 holding different mass fractions of sample molecules.

As described above, FIG. 3 shows a time-of-flight (TOF) mass spectrometer where initially closely bunched molecular or particulate ions are accelerated electrostatically to a particular kinetic energy, and then separate out longitudinally as the ones with a higher mass/charge ratio fly slower and increasingly lag behind those with a lower mass/charge ratio. A laser beam co-or counterpropagating with the molecular beam excites the molecules to fluorescence, which is observed with spatial resolution along the beam, hyperspectral resolution, and time resolution.

More specifically, FIG. 3 shows a time-of-flight mass spectrometer 301 where pulsed bunches of molecular/particulate ions 302 containing multiple molecular/particulate species X, Y, Z 303 enter an acceleration-and-beam-forming section of the mass spectrometer 301. After acceleration, the molecular beam "drifts" freely, and the lighter 304 (lower mass/charge ratio) ions increasingly get ahead of the intermediate-mass 305, and the heavier 306 ones, so that they are all strung out by mass along the beam axis. The ions continue to a beam dump 308 where a conventional molecular detector, such as a micro-channel plate or a channeltron may be situated. A pulsed laser beam 309 beam co- or counterpropagating with the molecular beam excites the sample molecules to fluorescence, and the fluorescent light is imaged by a lens 310 or, generally, an imaging optical system onto an imaging-capable ultrafast time-resolving photon detector 311 such as the LAPPD (see Par. 14). Part of the imaging system is a wavelength-dispersive element, such as a diffraction grating 312, which sends different wavelengths of fluorescent light to different locations 313, along the wave-length coordinate 314 on the photon detector 311. The other spatial coordinate on the photon detector 311 is called the mass coordinate 315 because it corresponds to the time-variable locations along the molecular beam 307 holding different mass fractions of sample molecules.

FIG. 4 shows a trapping mass spectrometer, specifically an Orbitrap. Molecular ions undergo periodic motion in closed orbits with a period proportional to the square root of their mass/charge ratio. Their motion is measured through image currents induced in the walls of the orbitrap, and the distinct orbital-frequency components are extracted from that current through a Fourier transform. At the same time, a laser beam excites the orbiting ions to fluorescence, and the time-and-spectrally resolved fluorescence signal is measured with a CUTID, such as an LAPPD™.

More specifically, FIG. 4 shows an Orbitrap mass spectrometer 401 consisting of an inner electrode 402 and an outer electrode 403 at different electrical potentials. A molecular or particulate ion is trapped between these two electrodes in a closed orbit 404, which repeats at a period given by the square root of its mass/charge ratio. The charge of the ion induces an image current in the outer electrode 403, which is measured with a differential amplifier 405. The orbital periods, and thus the masses of different molecular and particulate species are found as intensity 406 peaks over the mass axis 407 in a Fourier transform of the image current with respect to time. The fluorescent light 408 from trapped ions intercepting a fluorescence-exciting pulsed laser beam 409 beam is imaged by a lens 410 or, generally, an imaging optical system onto an imaging-capable ultrafast time-resolving photon detector 411 such as the LAPPD (see Par. 14). Part of the imaging system is a wavelength-dispersive element, such as a diffraction grating 412, which sends different wavelengths of fluorescent light to different locations along the wavelength coordinate 414 on the photon detector 411. The other spatial coordinate on the photon detector 411 is called the orbit coordinate 415 because it corresponds to the time-variable locations along the closed orbit 404. Resolution along this coordinate can be used for improvement of measurement statistics through correlations between fluorescence measurements from successive laser pulses. By changing the angle 413 between the pulsed laser beam 409 and the symmetry axis of the Orbitrap device, ions in particular orbits can be excited preferentially.

In summary, the present invention provides a system for performing mass spectrometry and optical spectroscopy simultaneously in one instrument and in correlation with each other. This provides optical-spectroscopic information separately for each mass fraction of the sample.

The system performs optical fluorescence spectroscopy on molecules, nanoparticles, and so forth, where the time dependence of the fluorescent decay is recorded with spatial resolution, as well as the hyperspectrally resolved wavelength spectrum, so that time-dependent wavelength shifts of the fluorescence are measured as a function of the spatial coordinate(s).

This is done continuously, i.e., without time-gating or otherwise modulating the sensitivity of the sensor. A sensor capable of this performance is referred herein as a Continuously Ultrafast Time-resolving Imaging Detector (CUTID).

This be done at the sensitivity level of individual photons and at a dark-count rate (events not due to a photon), or image noise, that is negligible in comparison to the true photon-detection rate.

The system is capable of recording individual fluorescent photons at a combined time and wavelength-spectral resolution at a time-bandwidth product at the quantum limit.

The system performs optical spectroscopy on molecules in-flight spatio-temporally separated by a mass spectrometer as a corresponding spatio-temporal sequence of optical spectra.

The system performs optical fluorescence spectroscopy on molecules in-flight spatio-temporally separated by a mass spectrometer as a corresponding spatial and mass-spectroscopic temporal sequence of optical spectra resolved with respect to wavelength or optical-spectroscopic time, or wavelength and optical-spectroscopic time combined. Here, a distinction is drawn between, on the one hand, a relatively slowly progressing mass-spectroscopic time corresponding to the passage of mass fractions through the region where optical spectroscopy is performed, and, on the other hand, a rapid optical-spectroscopic time corresponding to the decay of fluorescence. The former would be, typically, measured in microseconds or milliseconds, and the latter in nanoseconds.

The system performs optical spectroscopy on molecules spatially separated by a mass spectrometer and deposited on a substrate.

The system performs optical fluorescence spectroscopy with combined wavelength-spectral and optical-spectroscopic time resolution on molecules spatially separated by a mass spectrometer and deposited on a substrate.

The system performs optical spectroscopy on molecules or particles in-flight during their transit through a TOF spectrometer.

The system performs optical spectroscopy on molecules or particles trapped on orbits within a mass spectrometer.

The system performs optical spectroscopy on molecules or particles trapped on orbits within a mass spectrometer in a way that is in-phase or otherwise proportional, over the measurement's mass-spectroscopic time, to the mass-spectroscopic signal itself.

The system performs optical fluorescence spectroscopy resolved with respect to wavelength spectrum and optical-spectroscopic time on molecules or particles trapped on orbits within a mass spectrometer in a way that is in-phase or otherwise proportional, over the measurement's mass-spectroscopic time, to the mass-spectroscopic signal itself.

The system accommodates two dimensions of the data space and fits them into one, specifically by multiplexing the fluorescence time dependence on the optical-spectroscopic time scale into the mass-spectroscopic time scale.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
performing a Time-resolved Hyperspectral Imaging Spectroscopy (THIS) on a molecular or particulate species captured and present in a trapping-type mass spectrometer.

2. The method of claim 1 further comprising:
correlating THIS data from successive laser pulses by their time-variable positions along a fluorescence-exciting laser-beam track imaged onto an orbit coordinate on a photon sensor, given known orbital velocities.

3. The method of claim 2 further comprising:
performing Fourier transform with respect to time to extract from two-dimensional THIS data being a superposition from contributions due to different molecular/particulate species the two-dimensional THIS data belonging to each separate molecular/particulate species.

4. A method comprising:
performing Time-resolved Hyperspectral fluorescence Spectroscopy (THS) in a form of Time-resolved Hyperspectral Imaging Spectroscopy (THIS) on a molecular or particulate species captured and present in a trapping-type mass spectrometer where one image coordinate corresponds to locations of the mass-selected species on their trajectories and the other to a wavelength.

* * * * *